(12) United States Patent
Hafner et al.

(10) Patent No.: US 6,277,935 B1
(45) Date of Patent: *Aug. 21, 2001

(54) POLYMERIZABLE COMPOSITION AND POLYMERIZATION METHOD

(75) Inventors: Andreas Hafner, Laupen; Paul Adriaan Van Der Schaaf, Fribourg; Andreas Mühlebach, Belfaux, all of (CH)

(73) Assignee: Ciba Specialty Chemicals Corporation, Tarrytown, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,559

(22) PCT Filed: Oct. 9, 1996

(86) PCT No.: PCT/EP96/04375

§ 371 Date: Apr. 13, 1998

§ 102(e) Date: Apr. 13, 1998

(87) PCT Pub. No.: WO97/14738

PCT Pub. Date: Apr. 24, 1997

(30) Foreign Application Priority Data

Oct. 19, 1995 (CH) .................................. 2969/95

(51) Int. Cl.[7] ...................................... C08F 4/80
(52) U.S. Cl. ....................... 526/171; 526/280; 526/281; 526/283
(58) Field of Search ................... 526/171, 280, 526/281, 283

(56) References Cited

U.S. PATENT DOCUMENTS 5,312,940 * 5/1994 Grubbs et al. ........................ 556/136
5,880,231 * 3/1999 Grubbs et al. ........................ 526/171

FOREIGN PATENT DOCUMENTS 9604289   2/1996  (WO) .

* cited by examiner

Primary Examiner—David W. Wu
Assistant Examiner—Caixia Lu
(74) Attorney, Agent, or Firm—Luther A. R. Hall

(57) ABSTRACT

A solventless polymerizable composition comprising
(a) at least one strained cycloolefin that is liquid or is meltable without decomposition, and
(b) a catalytic amount of at least one compound of formula I or Ia or a mixture of compounds of formula I and Ia

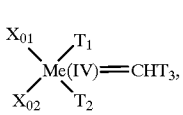
(I)

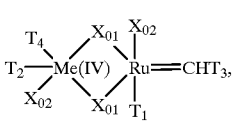

(Ia)

wherein

Me is ruthenium or osmium;

$T_1$ and $T_2$ are each independently of the other a tertiary phosphine or $T_1$ and $T_2$ together form a ditertiary diphosphine;

$T_3$ is hydrogen, $C_1$–$C_{12}$alkyl; $C_3$–$C_8$cycloalkyl, $C_3$–$C_7$heterocycloalkyl having one or two hetero atoms selected from the group —O—, —S— and —N—, $C_6$–$C_{14}$aryl, or $C_4$–$C_{15}$heteroaryl having from one to three hetero atoms selected from the group —O—, —S— and —N—, which are unsubstituted or substituted by $C_1$–$C_4$alkyl, $C_1$–$C_4$haloalkyl, $C_1$–$C_4$alkoxy, $C_6$–$C_{10}$aryl, $C_6$–$C_{10}$aryloxy, —$NO_2$ or by halogen;

$T_4$ is $C_6$–$C_{16}$arene or $C_4$–$C_{15}$heteroarene each of which is unsubstituted or substituted by from one to three $C_1$–$C_4$alkyl, $C_1$–$C_4$haloalkyl, $C_1$–$C_4$alkoxy, —OH, F, Cl or Br substituents, and $X_{01}$ and $X_{02}$ are each independently of the other halogen.

The compositions are suitable for the production of mouldings and coatings.

7 Claims, No Drawings

POLYMERIZABLE COMPOSITION AND POLYMERIZATION METHOD

The present invention relates to a solventless polymerizable composition comprising a strained cycloolefin and a ruthenium(IV) or osmium(IV) carbene, to a method of polymerising the composition, and to the use of the composition in the production of mouldings.

The thermal metathesis polymerization of strained cycloolefins has recently been gaining increasing importance. The polymerization requires the use of catalysts. Known catalysts are mainly transition metal compounds. While, as a rule, systems consisting of a catalyst and co-catalyst have been used in the first instance (see, for example, U.S. Pat. No. 4,060,468 and WO 93/13171), one-component catalysts are also known [Thoi, H. H., Ivin, K. J., Rooney, J. J., J. Mol. Catal. 15:245–270 (1982)]. WO 93/20111 discloses ruthenium(IV) and osmium(IV) compounds having a =CH—CH=$CR_1R_2$ group bonded to the metal atoms as catalysts for thermal metathesis polymerization. Those "metal carbenes" are sparingly soluble compounds, so that polymerization is possible only in polar and, where appropriate, protic solutions. The same catalysts are described by Kanaoka and Grubbs [Kanaoka, S., Grubbs, R. H., Macromolecules 28:4707–4713 (1995)] under the same conditions of solution polymerization for the preparation of copolymers with silicon-containing norbornene derivatives. In that procedure the polymers have to be isolated and purified and also converted into a processible form, for example granules. For the production of shaped articles it is then necessary to employ in addition thermoplastic shaping procedures. The large number of processing steps generally results in a reduction in the mechanical and other performance properties, for example in discoloration. The use of solvents and the additional process steps are so disadvantageous from ecological and economic standpoints that industrial application is out of the question. In addition, the direct processing of solvent-containing systems to form bubble-free and homogeneous mouldings is either not possible at all or is possible only with difficulty, but such processing is necessary, however, because on the one hand the solvents used adversely affect the mechanical properties (for example there may be a plasticiser effect) and those properties will channe until all the solvent has been lost, and on the other hand a constant release of solvents ecologically harmful.

Fraser et al. [Fraser, C., Hillmyer, M., Gutierrez, E., Grubbs, R. H., Polym. Prepr. 36:237–238 (1995)] disclose for the first time $[(C_6H_{11})_3P]_3(C_6H_5—CH=)RuCl_2$ (a ruthenium carbene) as thermal catalyst for the polymerization of mixtures of cyclooctadiene and 4,7-dihydro-1,3-oxepine. That ruthenium carbene is a very active catalyst which is capable of initiating polymerization even at room temperature. Here too, polar and halogenated solvents, specifically a concentrated solution of the catalyst in methylene chloride, are used in the polymerization, so that the above-described disadvantages are not overcome.

The preparation of $[(C_6H_{11})_3P]_3(C_6H_5—CH=)RuCl_2$ and other ruthenium carbene compounds is disclosed by Schwab et al. [Schwab, P., France, M. B., Ziller, J. W., Grubbs, R. H., Angew. Chem. 107:2179–2181 (1995)]. They are described as highly active catalysts for ring-opening metathesis polymerization. For polymerizations carried out with norbornene and substituted cyclobutenes, either methylene chloride or benzene is used as solvent.

It should also be mentioned that Tanielian et al. [Tanielian, C., Kiennemann, A., Osparpucu, T., Can. J. Chem. 57:2022–2027 (1979)] describe that the ruthenium compound $RuCl_2[P(C_6H_5)_3]_3$ is deactivated by dicyclopentadiene and no polymers are formed by metathesis polymerization.

It has now surprisingly been found that those ruthenium carbenes have excellent solubility in monomeric strained cycloolefins even when the monomers do not contain polar groups or substituents and are composed only of carbon and hydrogen. This allows bulk polymerization and the direct production of mouldings. Despite the high activity of the catalysts, dilution and reduction of the reactivity with a polar solvent is unnecessary, and it is possible to prepare directly-processible compositions from the catalyst-containing monomer. The disadvantages resulting from a solvent content, such as the risk of bubble formation and a change in the mechanical properties, no longer exist.

The invention relates firstly to a solventless polymerizable composition comprising (a) at least one strained cycloolefin that is liquid or is meltable without decomposition, and (b) a catalytic amount of at least one compound of formula I or Ia or a mixture of compounds of formulae I and Ia

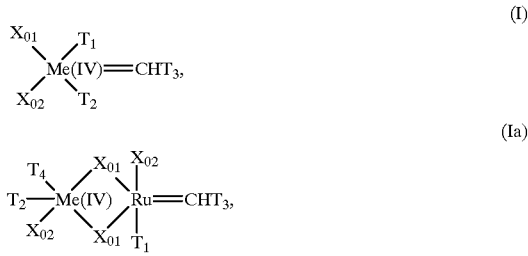

wherein

Me is ruthenium or osmium;

$T_1$ and $T_2$ are each independently of the other a tertiary phosphine or $T_1$ and $T_2$ together form a ditertiary diphosphine;

$T_3$ is hydrogen, $C_1$–$C_{12}$alkyl; $C_3$–$C_8$cycloalkyl, $C_3$–$C_7$heterocycloalkyl having one or two hetero atoms selected from the group —O—, —S— and —N—, $C_6$–$C_{14}$aryl, or $C_4$–$C_{15}$heteroaryl having from one to three hetero atoms selected from the group —O—, —S— and —N—, which are unsubstituted or substituted by $C_1$–$C_4$alkyl, $C_1$–$C_4$haloalkyl, $C_1$–$C_4$alkoxy, $C_6$–$C_{10}$aryl, $C_6$–$C_{10}$aryloxy, —$NO_2$ or by halogen;

$T_4$ is $C_6$–$C_{16}$arene or $C_4$–$C_{15}$heteroarene each of which is unsubstituted or substituted by from one to three $C_1$–$C_4$alkyl, $C_1$–$C_4$haloalkyl, $C_1$–$C_4$alkoxy, —OH, F, Cl or Br substituents, and $X_{01}$ and $X_{02}$ are each independently of the other halogen.

Within the scope of this invention, a solventless composition contains from 0 to 4 %, preferably from 0 to 2 %, solvent, based on the cycloolefin.

The cyclic olefins may be monocyclic or polycyclic condensed and/or bridged and/or linked ring systems, for example having from two to four rings, which are unsubstituted or substituted and may contain hetero atoms, for example an O, S, N or Si atom, in one or more rings and/or may contain condensed aromatic or heteroaromatic rings, for example o-phenylene, o-naphthylene, o-pyridinylene or o-pyrimidinylene. The individual cyclic rings may contain from 3 to 16, preferably from 3 to 12 and especially from 3 to 8, ring members.

The cyclic olefins may contain further non-aromatic double bonds, preferably, depending upon the ring size, from 2 to 4 such additional double bonds. The ring substituents are inert, that is to say they do not adversely affect the chemical stability and the thermal stability of the ruthenium and osmium catalysts. The cycloolefins are strained rings or ring systems. Individual rings and ring systems having from 5 to 8 carbon atoms in the ring are especially preferred.

When the cyclic olefins contain more than one double bond, for example from 2 to 4 double bonds, or when mixtures of strained cycloolefins having one double bond and strained cycloolefins having at least two double bonds, for example from 2 to 4 double bonds, are used, then, depending upon the reaction conditions, the monomer chosen and the amount of catalyst, it is also possible for cross-linked polymerisates to be formed.

In a preferred embodiment of the composition according to the invention, the cycloolefins correspond to formula II

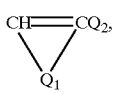

(II)

wherein $Q_1$ is a radical having at least one carbon atom which, together with the —CH=$CQ_2$— group, forms an at least 3-membered alicyclic ring which may contain one or more hetero atoms selected from the group Si, P, O, N and S; and which is unsubstituted or substituted by halogen, =O, —CN, —$NO_2$, $R_1R_2R_3Si$—(O)$_u$—, —COOM, —$SO_3M$, —$PO_3M$, —COO($M_1$)$_{1/2}$, —$SO_3$($M_1$)$_{1/2}$, —$PO_3(M_1)_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or by $R_4$—X—; or wherein two adjacent carbon atoms, when present, are substituted by —CO—O—CO— or by —CO—$NR_5$—CO—; or wherein an alicyclic, aromatic or heteroaromatic ring has been fused to adjacent carbon atoms of the alicyclic ring, the former ring being unsubstituted or substituted by halogen, —CN, —$NO_2$, $R_6R_7R_8Si$—(O)$_u$—, —COOM, —$SO_3M$, —$PO_3M$, —COO($M_1$)$_{1/2}$, —$SO_3(M_1)_{1/2}$, —$PO_3(M_1)_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$-cycloalkkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$-heteroaralkyl or by $R_{13}$—$X_1$—; X and $X_1$ are each independently of the other —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—; $R_1$, $R_2$ and $R_3$ are each independently of the others $C_1$–$C_{12}$alkyl, $C_1$–$C_{12}$perfluoroalkyl, phenyl or benzyl; $R_4$ and $R_{13}$ are each independently of the other $C_1$–$C_{20}$alkyl, $C_1$–$C_{20}$-haloalkyl, $C_1$–$C_{20}$hydroxyalkyl, $C_3$–$C_8$cycloalkyl, $C_6$–$C_{16}$aryl or $C_7$–$C_{16}$aralkyl; $R_5$ and $R_{10}$ are each independently of the other hydrogen, $C_1$–$C_{12}$alkyl, phenyl or benzyl, the alkyl groups in turn being unsubstituted or substituted by $C_1$–$C_{12}$alkoxy or by $C_3$–$C_8$cycloalkyl; $R_6$, $R_7$ and $R_8$ are each independently of the others $C_1$–$C_{12}$alkyl, $C_1$–$C_{12}$perfluoroalkyl, phenyl or benzyl; M is an alkali metal and $M_1$ is an alkaline earth metal; and u is 0 or 1; it being possible for the alicyclic ring formed with $Q_1$ to contain further non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN or $R_{11}$—$X_2$— wherein $R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl and $X_2$ is —C(O)—O— or —C(O)—$NR_{12}$— wherein $R_{12}$ is hydrogen, $C_1$–$C_{12}$alkyl, phenyl or benzyl;

the above-mentioned cycloalkyl, heterocycloalkyl, aryl, heteroaryl, aralkyl and heteroaralkyl groups being unsubstituted or substituted by $C_1$–$C_{12}$alkyl, $C_1$–$C_{12}$alkoxy, —$NO_2$, —CN or by halogen, and the hetero atoms of the aforementioned heterocycloalkyl, heteroaryl and heteroaralkyl groups being selected from the group —O—, —S—, —$NR_9$— and —N=; and $R_9$ is hydrogen, $C_1$–$C_{12}$alkyl, phenyl or benzyl.

Fused-on alicyclic rings contain preferably from 3 to 8, especially from 5 to 8 and more especially 5 or 6, ring carbon atoms.

When an asymmetric centre is present in the compounds of formula I, the compounds may occur in optically isomeric forms. Some compounds of formula I may occur in tautomeric forms (for example keto-enol tautomerism). When an aliphatic C=C double bond is present, geometric isomerism (E-form or Z-form) may occur. Exo-endo configurations are also possible. The formula I therefore includes all possible stereoisomers present in the form of enantiomers, tautomers, diastereoisomers, E/Z-isomers or mixtures thereof.

In the definitions of the substituents, the alkyl, alkenyl and alkynyl groups may be straight-chain or branched. The same applies also to the (or each) alkyl moiety of alkoxy, alkylthio and alkoxycarbonyl and other alkyl-containing groups. Those alkyl groups contain preferably from 1 to 12, especially from 1 to 8 and more especially from 1 to 4, carbon atoms. Those alkenyl and alkynyl groups contain preferably from 2 to 12, especially from 2 to 8 and more especially from 2 to 4, carbon atoms.

Alkyl includes, for example, methyl, ethyl, isopropyl, n-propyl, n-butyl, isobutyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl includes, for example, hydroxymethyl, hydroxyethyl, 1-hydroxyisopropyl, 1-hydroxy-n-propyl, 2-hydroxy-n-butyl, 1-hydroxyisobutyl, 1-hydroxy-sec-butyl, 1-hydroxy-tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl includes, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and also halogenated, especially fluorinated or chlorinated, alkanes, for example isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-octadec-2-enyl and n-octadec-4-enyl.

Cycloalkyl is preferably $C_5$–$C_8$cloalkyl, especially $C_5$— or $C_6$-cycloalkyl. Some examples are cyclopropyl, dimethylcyclopropyl, cyclobutyl, cyclopentyl, methylcyclopentyl, cyclohexyl, cycloheptyl and cyclooctyl.

Cyanoalkyl includes, for example, cyanomethyl (methyinitrile), cyanoethyl (ethylnitrile), 1-cyanoisopropyl, 1-cyano-n-propyl, 2-cyano-n-butyl, 1-cyano-isobutyl, 1-cyano-sec-butyl, 1-cyano-tert-butyl and the various isomeric cyanopentyl and cyanohexyl radicals.

Aralkyl contains preferably from 7 to 12 carbon atoms and especially from 7 to 10 carbon atoms. It may be, for example, benzyl, phenethyl, 3-phenylpropyl, α-methylbenzyl, phenbutyl or α,α-dimethylbenzyl.

Aryl preferably contains from 6 to 10 carbon atoms. It may be, for example, phenyl, pentaline, indene, naphthalene, azulene or anthracene.

Heteroaryl preferably contains 4 or 5 carbon atoms and one or two hetero atoms from the group O, S and N. It may be, for example, pyrrole, furan, thiophene, oxazole, thiazole, pyridine, pyrazine, pyrimidine, pyridazine, indole, purine or quinoline.

Heterocycloalkyl preferably contains 4 or 5 carbon atoms and one or two hetero atoms from the group O, S and N. It may be, for example, oxirane, azirine, 1,2-oxathiolane, pyrazoline, pyrrolidine, piperidine, piperazine, morpholine, tetrahydrofuran or tetrahydrothiophene.

Alkoxy is, for example, methoxy, ethoxy, propyloxy, isopropyloxy, n-butyloxy, isobutyloxy and tert-butyloxy.

Within the scope of this invention, an alkali metal is to be understood as being lithium, sodium, potassium, rubidium or caesium, especially lithium, sodium or potassium.

Within the scope of this invention, an alkaline earth metal is to be understood as being beryllium, magnesium, calcium, strontium or barium, especially magnesium or calcium.

In the above definitions, halogen is to be understood as being fluorine, chlorine, bromine or iodine, preferably fluorine, chlorine or bromine.

Compounds of formula II that are especially suitable for the composition according to the invention are those wherein $Q_2$ is hydrogen.

Also preferred for the composition are compounds of formula II in which the alicyclic ring formed by $Q_1$ together with the —CH=CQ$_2$— group has from 3 to 16, preferably from 3 to 12, especially from 3 to 8, and more especially from 5 to 8, ring atoms, and which may be monocyclic, bicyclic, tricyclic or tetracyclic ring systems.

It is especially advantageous when the composition according to the invention comprises compounds of formula II wherein $Q_1$ is a radical having at least one carbon atom which, together with the —CH=CQ$_2$— group, forms a 3— to 20-membered alicyclic ring which may contain one or more hetero atoms selected from the group Si, O, N and S; and which is unsubstituted or substituted by halogen, =O, —CN, —NO$_2$, $R_1R_2R_3Si$—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$–$C_{12}$alkyl, $C_1$–$C_{12}$haloalkyl, $C_1$–$C_{12}$hydroxyalkyl, $C_1$–$C_4$-cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$-heteroaryl, $C_4$–$C_{12}$heteroaralkyl or by $R_4$—X—; or wherein two adjacent carbon atoms in that radical $Q_1$ are substituted by —CO—O—CO— or by —CO—NR$_5$—CO—; or wherein an alicyclic, aromatic or heteroaromatic ring may have been fused to adjacent carbon atoms, which ring is unsubstituted or substituted by halogen, —CN, —NO$_2$, $R_6R_7R_8Si$—, —COOM, —SO$_3$M, —PO$_3$M, —COO(M$_1$)$_{1/2}$, —SO$_3$(M$_1$)$_{1/12}$, —PO$_3$(M$_1$)$_{1/2}$, $C_1$–$C_{12}$alkyl, $C_1$–$C_{12}$-haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$-aralkyl, $C_3$–$C_6$heterocycloalkyl, $C_3$–$C_{12}$heteroaryl, $C_4$–$C_{12}$heteroaralkyl or by $R_{13}$—X$_1$—; X and X$_1$ are each independently of the other —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—; and R$_1$, R$_2$ and R$_3$ are each independently of the others $C_1$–$C_6$alkyl, $C_1$–$C_6$perfluoroalkyl, phenyl or benzyl; M is an alkali metal and M$_1$ is an alkaline earth metal; R$_4$ and R$_{13}$ are each independently of the other $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl or $C_7$–$C_{12}$aralkyl; R$_5$ and R$_{10}$ are each independently of the other hydrogen, $C_1$C$_6$alkyl, phenyl or benzyl, the alkyl groups in turn being unsubstituted or substituted by $C_1$–$C_6$-alkoxy or by $C_3$–$C_6$cycloalkyl; R$_6$, R$_7$ and R$_8$ are each independently of the other $C_1$–$C_6$-alkyl, $C_1$–$C_6$perfluoroalkyl, phenyl or benzyl; u is 0 or 1; it being possible for the alicyclic ring formed with $Q_1$ to contain further non-aromatic double bonds;

$Q_2$ is hydrogen, $C_1$–$C_{12}$alkyl, $C_1$–$C_{12}$haloalkyl, $C_1$–$C_6$alkoxy, halogen, —CN or $R_{11}$—X$_2$— wherein $R_{11}$ is $C_1$–$C_{12}$alkyl, $C_1$–$C_{12}$haloalkyl, $C_1$–$C_{12}$hydroxyalkyl, $C_3$–$C_6$cycloalkyl, $C_6$–$C_{12}$aryl or $C_7$–$C_{12}$aralkyl and X$_2$ is —C(O)—O— or —C(O)—NR$_{12}$— wherein R$_{12}$ is hydrogen, $C_1$–$C_6$alkyl, phenyl or benzyl;

and the cycloalkyl, heterocycloalkyl, aryl, heteroaryl, aralkyl and heteroaralkyl groups being unsubstituted or substituted by $C_1$–$C_6$alkyl, $C_1$–$C_6$alkoxy, —NO$_2$, —CN or by halogen, and the hetero atoms of the heterocycloalkyl, heteroaryl and heteroaralkyl groups being selected from the group —O—, —S—, —NR$_9$— and —N=; and R$_9$ is hydrogen, $C_1$–$C_6$alkyl, phenyl or benzyl.

From that group preference is given to those compounds of formula II wherein $Q_1$ is a radical having at least one carbon atom which, together with the —CH=CQ$_2$— group, forms a 3— to 10-membered alicyclic ring which may contain a hetero atom selected from the group Si, O, N and S, and which is unsubstituted or substituted by halogen, —CN, —NO$_2$, $R_1R_2R_3Si$—, —COOM, —SO$_3$M, —PO$_3$M, —COO(M$_1$)$_{1/2}$, —SO$_3$(M$_1$)$_{1/2}$—PO$_3$(M$_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or by $R_4$—X—; or wherein an alicyclic, aromatic or heteroaromafic ring may have been fused to adjacent carbon atoms, which ring is unsubstituted or substituted by halogen, —CN, —NO$_2$, $R_6R_7R_8Si$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or by $R_{13}$—X$_1$—; R$_1$, R$_2$ and R$_3$ are each independently of the others $C_1$–$C_4$alkyl, $C_1$–$C_4$perfluoroalkyl, phenyl or benzyl; M is an alkali metal and M$_1$ is an alkaline earth metal; R$_4$ and R$_{13}$ are each independently of the other $C_1$–$C_6$alkyl, $C_1$–$C_6$haloalkyl, $C_1$–$C_6$hydroxyalkyl or $C_3$–$C_6$cycloalkyl; X and X$_1$ are each independently of the other —O—, —S—, —CO—, —SO— or —SO$_2$—; R$_6$, R$_7$ and R$_8$ are each independently of the others $C_1$–$C_4$alkyl, $C_1$–$C_4$perfluoroalkyl, phenyl or benzyl; and $Q_2$ is hydrogen.

The composition according to the invention comprises especially norbornene and norbomene derivatives, norbomadiene, dicyclopentadiene, cyclopentene, cycloheptene, cyclooctene, cyclooctadiene or cyclododecene. Surprisingly it has been found that in the case of substituted norbomene the polymerization also proceeds well when the substituents are in the endo-position.

Of the norbornene derivatives, special preference is given to those corresponding to formula III

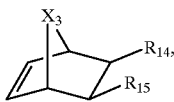
(III)

wherein $X_3$ is —$CHR_{16}$—, oxygen or sulfur;

$R_{14}$ and $R_{15}$ are each independently of the other hydrogen, —CN, trifluoromethyl, $(CH_3)_3Si$—O—, $(CH_3)_3Si$— or —$COOR_{17}$; and $R_{16}$ and $R_{17}$ are each independently of the other hydrogen, $C_1$–$C_{12}$alkyl, phenyl or benzyl;

or to formula IV

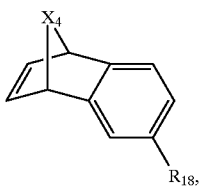
(IV)

wherein $X_4$ is —$CHR_{19}$—, oxygen or sulfur;

$R_8$ is hydrogen, $C_1$–$C_6$alkyl or halogen; and $R_{19}$ is hydrogen, $C_1$–C—$C_{12}$alkyl, phenyl or benzyl;

or to formula V

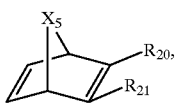
(V)

wherein $X_5$ is —$CHR_{22}$, oxygen or sulfur;

$R_{20}$ and $R_{21}$ are each independently of the other hydrogen, CN, trifluoromethyl, $(CH_3)_3Si$—O—, $(CH_3)_3Si$— or —$COOR_{23}$; and $R_{22}$ and $R_{23}$ are each independently of the other hydrogen, $C_1$–$C_{12}$alkyl, phenyl or benzyl;

or to formula VI,

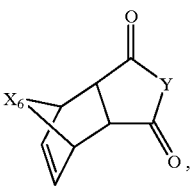
(VI)

wherein $X_6$ is —$CHR_{24}$—, oxygen or sulfur;

Y is oxygen or

$R_{24}$ is hydrogen, $C_1$–$C_{12}$alkyl, phenyl or benzyl; and $R_{25}$ is hydrogen, methyl, ethyl or phenyl.

It has surprisingly been found that using the Ru and Os catalysts to be used according to the invention it is possible to polymerize even dicyclopentadiene, oligopentadienes and Diels-Alder adducts of cyclopentadiene with cycloolefins or open-chain dienes. Those monomers are a preferred sub-group of strained cycloolefins, because their polymerization was not to be expected.

Another preferred sub-group of monomers is formed by those composed only of carbon and hydrogen.

The following compounds of formula I which may be preparable by Diels-Alder reactions are some specific examples, it being possible for the oxanorbornene derivatives also to be norbornene derivatives and vice versa:

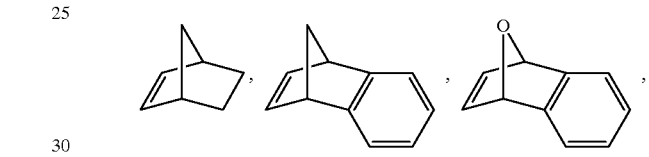

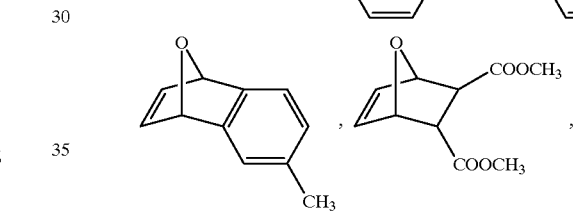

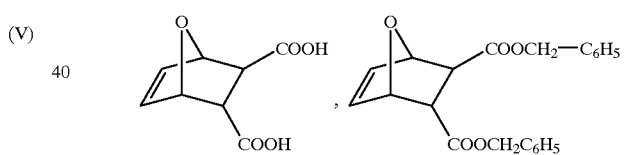

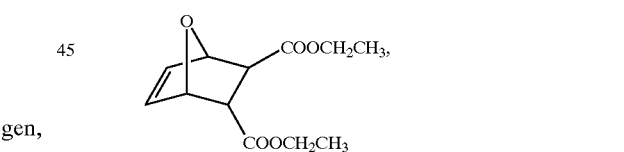

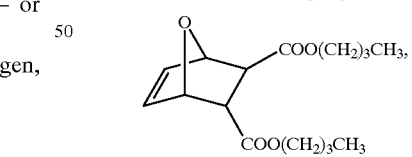

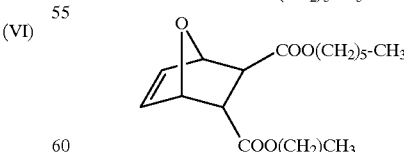

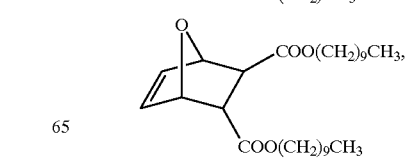

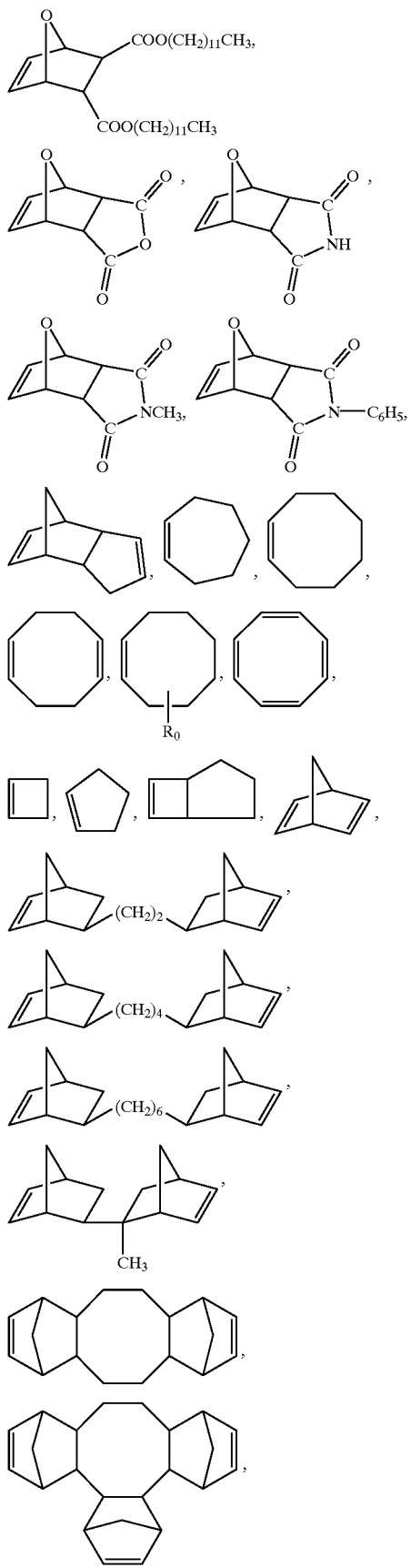
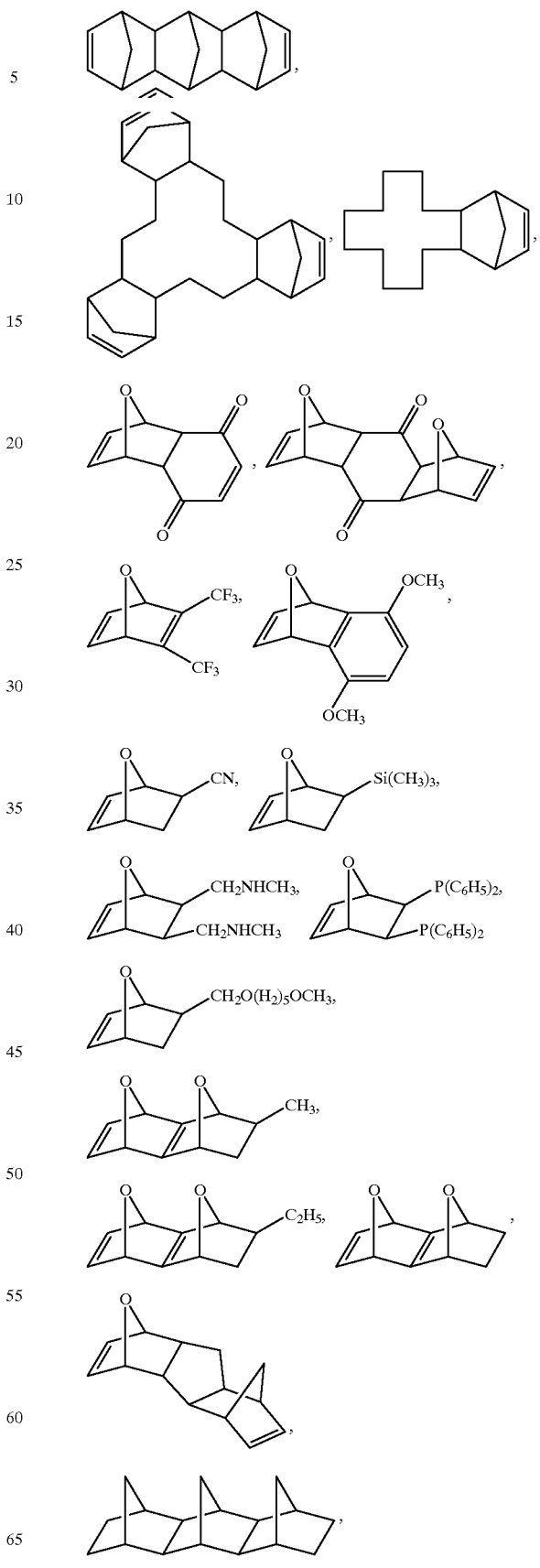

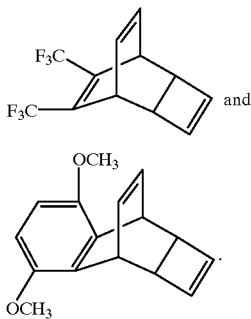

and

R₀ can, for example, be an epoxy, acrylate or methacrylate group which is covalently bonded to the cyclooctene directly or via a bridge group.

Condensed and/or bridged and/or linked olefinically unsaturated ring systems are generally prepared by means of Diels-Alder reactions. Within the scope of the invention, "meltable without decomposition" means that strained cycloolefins can be melted and the catalyst can be dissolved. In the case of thermally labile strained cycloolefins it may therefore be necessary to dissolve the catalyst under pressure. Where the reaction temperature is higher than the decomposition temperature of the strained cycloolefin, it is advisable to carry out the procedures under pressure in order to avoid decomposition of the monomers prior to polymerization.

In a preferred embodiment, the compositions according to the invention additionally contain an acetylene or a diene, preferably a 1,3-diene, for example in amounts of from 0.000001 to 5% by weight, preferably from 0.000001 to 3% by weight, based on the strained cycloolefin. Cyclic dienes are preferred. Some examples of open-chain and cyclic dienes are butadiene, norbomadiene, cydopentadiene, cyclohexa-1,3-diene, cyclohepta-1,3-diene, cycloocta-1,3-diene and cycloocta-1,5diene. Suitable acetylenes are mono- or di-substituted. Some examples are methylacetylene, ethylacetylene, n- or iso-propylacetylene, n-, iso- and tert-butylacetylene, trimethylsilylacetylene, dimethylacetylene, methylethylacetylene and dipropylacetylene. Depending upon the acetylene or diene chosen, a catalyst used according to the invention can be selectively partially inhibited and the processing time prolonged.

$X_{01}$ and $X_{02}$ in formulae I and Ia are preferably F, Cl or Br, especially Cl or Br, and are more especially each Cl.

Me in formulae I and Ia is preferably ruthenium.

In a preferred embodiment, $T_3$ is a hydrogen atom or $T_3$ is a hydrocarbon radical having from 1 to 16, preferably from 1 to 12, carbon atoms as defined within the scope of the inventon.

T3 as alkyl may contain preferably from 1 to 8 and especially from 1 to 6 carbon atoms. Some examples of alkyl are methyl, ethyl and the isomers of propyl, butyl, pentyl, hexyl, heptyl, octyl, nonyl, decyl, undecyl and dodecyl. $T_3$ is especially linear $C_1$–$C_4$alkyl.

$T_3$ as cycloalkyl may contain preferably from 5 to 8 carbon atoms. Cyclopentyl and cyclohexyl are especially preferred.

$T_3$ as heterocycloalkyl may preferably contain 4 or 5 carbon atoms and preferably a hetero atom selected from the group —O—, —S— and —N—. Some examples are tetrahydrofuranyl, pyrrolidinyl, piperazinyl and tetrahydrothiophenyl.

$T_3$ as aryl may contain preferably from 6 to 10 carbon atoms. Preferred examples are naphthyl and especially phenyl.

$T_3$ as heteroaryl may contain preferably 4 or 5 carbon atoms and one or two hetero atoms selected from the group —O—, —S— and —N—. Some examples are furanyl, thiophenyl, pyrrolyl, pyridinyl and pyrimidinyl.

Preferred subsbtuents for $T_3$ are methyl, ethyl, methoxy, ethoxy, trichloromethyl, trifluoromethyl, phenyl, phenyloxy, F and Cl.

In a preferred embodiment, $T_3$ is hydrogen, $C_1$–$C_4$alkyl, cyclopentyl, cyclohexyl, phenyl or naphthyl, which are unsubstituted or substituted by $C_1$–$C_4$alkyl, $C_1$–$C_4$alkoxy, $C_1$–$C_4$haloalkyl, phenyl, F or Cl.

In formula Ia, $T_4$ contains as arene preferably from 6 to 12 carbon atoms and as heteroarene preferably from 4 to 11 carbon atoms and preferably from 1 to 3 hetero atoms from the group O, S and N. Some examples of substituents for $T_4$ are methyl, ethyl, n- or isopropyl, n-, iso- or tert-butyl, methoxy, ethoxy, trifluoromethyl, F and Cl. Preferred arenes and heteroarenes are benzene, toluene, xylene, trimethylbenzene, naphthalene, biphenyl, anthracene, acenaphthene, fluorene, phenanthrene, pyrene, chrysene, fluoranthrene, furan, thiophene, pyrrole, pyridine, γ-tpyran, γ-thiopyran, pyrimidine, pyrazine, indole, coumarone, thionaphthene, carbazole, dibenzofuran, dibenzothiophene, pyrazole, imidazole, benzimidazole, oxazole, thiazole, isooxazole, isothiazole, quinoline, isoquinoline, acridine, chromene, phenazine, phenoxazine, phenothiazine, triazine, thianthrene and purine. Arenes and heteroarenes that are given greater preference are benzene, naphthalene, cumene, thiophene and benzothiophene. Special preference is given to the arene benzene or a $C_1$–$C_4$alkyl-substituted benzene, for example toluene, xylene, isopropylbenzene, tert-butylbenzene or cumene, and special preference is given to the heteroarene thiophene.

Phosphine groups $T_1$ and $T_2$ are preferably tertiary phosphines, or ditertiary diphosphines having from 3 to 40, preferably from 3 to 30 and especially from 3 to 24, carbon atoms.

The phosphine ligands preferably correspond to formulae VII and VIIa, $$PR_{26}R_{27}R_{28} \quad \text{(VII)},$$

$$PR_{26}R_{27}P\!-\!Z_1\!-\!PR_{26}R_{27} \quad \text{(VIIa)},$$

wherein $R_{26}$, $R_{27}$ and $R_{28}$ are each independently of the others $C_1$–$C_{20}$allkyl; $C_4$–$C_{12}$cyloalkyl that is unsubstituted or substituted by $C_1$–$C_6$alkyl, $C_1$–$C_6$haloalkyl, —NO₂ or by $C_1$–$C_6$alkoxy; $C_6$–$C_{16}$aryl that is unsubstituted or substituted by $C_1$–$C_6$alkyl, $C_1$–$C_6$haloalkyl, —NO₂ or by $C_1$–$C_6$alkoxy; or $C_7$–$C_{16}$aralkyl that is unsubstituted or substituted by $C_1$–$C_6$alkyl, $C_1$–$C_6$-haloalkyl, —NO₂ or by $C_1$–$C_6$alkoxy; or the radicals $R_{26}$ and $R_{27}$ together form tetra- or pentamethylene that is unsubstituted or substituted by $C_1$–$C_6$alkyl, $C_1$–$C_6$haloalkyl, —NO₂ or by $C_1$–$C_6$alkoxy, or tetra- or penta-methylene that is unsubstituted or substituted by $C_1$–$C_6$alkyl, $C_1$–$C_6$haloalkyl, —NO₂ or by $C_1$–$C_6$alkoxy and condensed with one or two 1,2-phenylene groups, and $R_{28}$ is as defined above; and $Z_1$ is linear or branched, unsubstituted or $C_1$–$C_4$alkoxy-substituted $C_2$–$C_{12}$alkylene; unsubstituted or $C_1$–$C_4$alkyl- or $C_1$–$C_4$alkoxy-substituted 1,2- or 1,3-cycloalkylene having from 4 to 8 carbon atoms; unsubstituted or $C_1$–$C_4$alkyl-or $C_1$–$C_4$alkoxy-substituted 1,2- or 1,3-heterocycloalkylene having 5 or 6 ring members and a hetero atom from the group O and N; unsubstituted or $C_1$–$C_4$alkyl- or $C_1$–$C_4$alkoxy-substituted 1,2-phenylene, 1-methylene-phen-2-yl; 1,2-dimethylenebenzene; or unsubstituted or $C_1$–$C_4$alkyl- or $C_1$–$C_4$alkoxy-substituted 2,2'-biphenylene.

The radicals $R_{26}$, $R_{27}$ and $R_{28}$ are preferably identical radicals. Radicals $R_{26}$, $R_{27}$ and $R_{28}$ that are sterically demanding, for example cyclic or branched, especially α- and more especially α,α-di-branched alkyl groups, are especially preferred.

When $R_{26}$, $R_{27}$ and $R_{28}$ are substituted, the substituents are preferably $C_1$–$C_4$alkyl, $C_1$–$C_4$haloalkyl or $C_1$–$C_4$alkoxy. Halogen is preferably Cl and especially F. Examples of preferred substituents are methyl, methoxy, ethyl, ethoxy and trifluoromethyl. $R_{26}$, $R_{27}$ and $R_{28}$ may be substituted, for example, by from 1 to 3 substituents.

$R_{26}$, $R_{27}$ and $R_{28}$ as alkyl may be linear or branched and contain preferably from 1 to 12, especially from 1 to 8 and more especially from 1 to 6, carbon atoms. Examples of alkyl are methyl, ethyl, n- and iso-propyl, n-, iso- and tert-butyl, and the isomers of pentyl, hexyl, heptyl, octyl, nonyl, decyl, undecyl, dodecyl, tridecyl, tetradecyl, pentadecyl, hexadecyl, heptadecyl, octadecyl and eicosyl. Preferred examples are methyl, ethyl, n- and iso-propyl, n-, iso- and tert-butyl, 1-, 2- or 3-pentyl and 1-, 2-, 3- or 4-hexyl. Sterically demanding branched alkyl groups are especially preferred.

When $R_{26}$, $R_{27}$ and $R_{28}$ are cycloalkyl, they are preferably $C_5$–$C_8$cycloalkyl and especially $C_5$- or $C_6$-cycloalkyl. Some examples are cyclobutyl, cycloheptyl, cyclooctyl and especially cyclopentyl and cyclohexyl. Examples of substituted cycloalkyl are methyl-, dimethyl-, trimethyl-, methoxy-, dimethoxy-, trimethoxy-, trifluoromethyl-, bistrifluoromethyl- and tristrifluoromethyl-cylopentyl and -cyclohexyl.

When $R_{26}$, $R_{27}$ and $R_{28}$ are aryl, they are preferably $C_6$–$C_{12}$aryl and especially phenyl or naphthyl. Examples of substituted aryl are methyl-, dimethyl-, trimethyl-, methoxy-, dimethoxy-, trimethoxy-, trifluoromethyl-, bistrifluoromethyl- and tristrifluoromethyl-phenyl.

When $R_{26}$, $R_{27}$ and $R_{28}$ are aryl, they are preferably $C_7$–$C_{13}$aralkyl, the alkylene group in the aralkyl preferably being methylene. Aralkyl is especially benzyl. Examples of substituted aralkyl are methyl-, dimethyl-, trimethyl-, methoxy-, dimethoxy-, trimethoxy-, trifluoromethyl-, bistrifluoromethyl- and tristrdluoromethyl-benzyl.

Examples of unsubstituted or substituted and/or condensed tetra- and penta-methylene bonded to the P atom are:

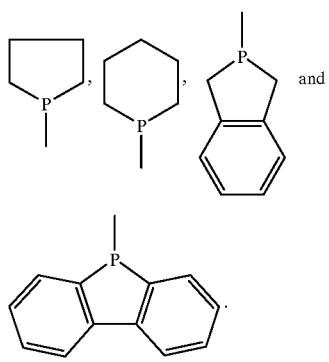

Other suitable phosphines are cycloaliphates having from 6 to 8 ring carbon atoms and bridged by a =$PR_{29}$ group, for example

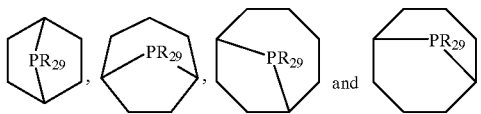

wherein $R_{29}$ is $C_1$–$C_6$alkyl, cyclohexyl, benzyl, or phenyl that is unsubstituted or substituted by one or two $C_1$–$C_4$alkyl substituents. $Z_1$ as linear or branched alkylene is preferably 1,2-alkylene or 1,3-alkylene having preferably from 2 to 6 carbon atoms, for example ethylene, 1,2-propylene or 1,2-butylene.

Examples of $Z_1$ as cycloalkylene are 1,2- and 1,3-cyclopentylene and 1,2- or 1,3-cyclohexylene. Examples of $Z_1$ as heterocycloalkylene are 1,2- and 1,3-pyrrolidine, 1,2- and 1,3-pipendine and 1,2- and 1,3-tetrahydrofuran.

In a preferred embodiment, the phosphine ligands correspond to formula VII wherein $R_{26}$, $R_{27}$ and $R_{28}$ are each independently of the others $C_1$–$C_6$alkyl; unsubstituted or $C_1$–$C_4$-alkyl-substituted cyclopentyl or cyclohexyl; unsubstituted or $C_1$–$C_4$alkyl-, $C_1$–$C_4$alkoxy- or trifluoromethyl-substituted phenyl; or unsubstituted or $C_1$–$C_4$alkyl-, $C_1$–$C_4$alkoxy- or trifluoromethyl-substituted benzyl. Especially preferred examples of phosphine ligands of formula VII are $(C_6H_5)_3P$, $(C_6H_5CH_2)_3P$, $(C_5H_{11})_3P$, $(CH_3)_3P$, $(C_2H_5)_3P$, $(n\text{-}C_3H_7)_3P$, $(iso\text{-}C_3H_7)_3P$, $(n\text{-}C_4H_9)_3P$, $(2\text{-methyl-}C_6H_4)_3P$, $(3\text{-}CH_3\text{-}C_6H_4)_3P$, $(4\text{-}CH_3\text{-}C_6H_4)_3P$, $(2,4\text{-di-}CH_3\text{-}C_6H_3)_3P$, $(2,6\text{-di-}CH_3\text{-}C_6H_3)_3P$, $(2\text{-}C_2H_5\text{-}C_6H_4)_3P$, $(3\text{-}C_2H_5\text{-}C_6H_4)_3P$, $(4C_2H_5\text{-}C_6H_4)_3P$, $(2\text{-n-}C_3H_7\text{-}C_6H_4)_3P$, $(3\text{-n-}C_3H_7\text{-}C_6H_4)_3P$, $(4\text{-n-}C_3H_7\text{-}C_6H_4)_3P$, $(2\text{-iso-}C_3H_7\text{-}C_6H_4)_3P$, $(3\text{-iso-}C_3H_7\text{-}C_6H_4)_3P$, $(4\text{-iso-}C_3H_7\text{-}C_6H_4)_3P$, $(2\text{-n-}C_4H_9\text{-}C_6H_4)_3P$, $(3\text{-n-}C_4H_9\text{-}C_6H_4)_3P$, $(4\text{-n-}C_4H_9\text{-}C_6H_4)_3P$, $(2\text{-iso-}C_4H_9\text{-}C_6H_4)_3P$, $(3\text{-iso-}C_4H_9\text{-}C_6H_4)_3P$, $(4\text{-iso-}C_4H_9\text{-}C_6H_4)_3P$, $(2\text{-tert-}C_4H_9\text{-}C_6H_4)_3P$, $(3\text{-tert-}C_4H_9\text{-}C_6H_4)_3P$, $(4\text{-tert-}C_4H_9\text{-}C_6H_4))_3P$, $(2\text{-}CH_3\text{-6-tert-}C_4H_9\text{-}C_6H_3)_3P$, $(3\text{-}CH_3\text{-6-tert-}C_4H_9\text{-}C_6H_3)_3P$, $(3\text{-}CH_3\text{-6-tert-}C_4H_9\text{-}C_6H_3)_3P$, $(2,6\text{-di-tert-}C_4H_9\text{-}C_6H_3)_3P$, $(2,3\text{-di-tert-}C_4H_9\text{-}C_6H_3)_3P$ and $(2,4\text{-di-tert-}C_4H_9\text{-}C_6H_3)_3P$.

A preferred subgroup of compounds of formulae I and Ia is formed by those of formulae Ib and Ic

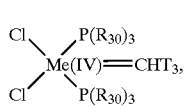

(Ib)

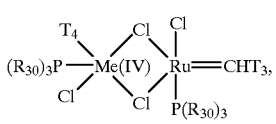

(Ic)

wherein

Me is Ru or Os, $R_{30}$ is α-branched $C_3$–$C_8$alkyl; $C_5$–$C_8$cycloalkyl that is unsubsbtuted or substituted by $C_1$–$C_4$alkyl, $C_1$–$C_4$haloalkyl, $C_1$–$C_4$alkoxy, halogen or by —$NO_2$; or $C_6$–$C_{10}$aryl that is unsubstituted or substituted by $C_1$–$C_4$alkyl, $C_1$–$C_4$haloalkyl, $C_1$–$C_4$alkoxy, halogen or by —$NO_2$;

$T_3$ is hydrogen; $C_1$–$C_6$alkyl; $C_5$–$C_8$cycloalkyl that is unsubstituted or substituted by $C_1$–$C_4$-alkyl, $C_1$–$C_4$haloalkyl, $C_1$–$C_4$alkoxy, halogen or by —$NO_2$; or $C_6$–$C_{10}$aryl that is unsubstituted or substituted by $C_1$–$C_4$alkyl, $C_1$–$C_4$haloalkyl, $C_1$–$C_4$alkoxy, halogen or by —$NO_2$; and $T_4$ is phenyl, or phenyl substituted by from one to three $C_1$–$C_4$alkyl substituents.

Some specific and preferred examples are [Me is Os(IV) and preferably Ru(IV)]:

$Cl_2[P(C_6H_{11})_3]_2Me=CH-C_6H_5$, $Cl_2[P(C_5H_9)_3]_2Me=CH-C_6H_5$, $Br_2[P(C_6H_{11})_3]_2Me=CH-C_6H_5$, $Br_2[P(C_5H_9)_3]_2Me=CH-C_6H_5$, $F_2[P(C_6H_{11})_3]_2Me=CH-C_6H_5$, $F_2[P(C_5H_9)_3]_2Me=CH-C_6H_5$, $Cl_2[P(C_6H_{11})_3]_2Me=CH(C_6H_4-Cl)$, $Cl_2[P(C_5H_9)_3]_2Me=CH(C_6H_4-Br)$, $Br_2[P(C_6H_{11})_3]_2Me=CH(C_6H_4-NO_2)$, $Br_2[P(C_5H_9)_3]_2Me=CH(C_6H_4-OC_2H_5)$, $Cl_2[P(C_6H_{11})_3]_2Me=CH(C_6H_4-CH_3)$, $F_2[P(C_5H_9)_3]_2Me=CH[C_6H_3-(CH_3)_2]$, $Cl_2[P(C_6H_{11})_3]_2Me=CH-C_{10}h_9$, $Cl_2[P(C_5H_9)_3]_2Me=CH-CH_3$, $Cl_2[P(C_6H_{11})_3]_2Me=CHCH_3$, $Br_2[P(C_5H_9)_3]_2Me=CH-iso-C_3H_7$, $Cl_2[P(C_6H_{11})_3]_2Me=CH-tert-C_4H_9$, $Cl_2[P(C_5H_9)_3]_2Me=CH-n-C_4H_9$, $Cl_2[P(C_6H_{11})_3]_2Me=CH-C_6H_4-OCH_3$, $Cl_2[P(C_5H_9)_3]_2Me=CH-C_6H_3-(CH_3)_2$, $Br_2[P(C_6H_{11})_3]_2Me=CH-C_6H_2-(CH_3)_3$, $Br_2[P(C_5H_9)_3]_2Me=CH-CH_2C_6H_5$, $Cl_2[P(tert-C_4H_9)_3]_2Me=CH-C_6H_5$, $Cl_2[P(iso-C_3H_7)_3]_2Me=CH-C_6H_5$, $Cl_2[P(C_6H_5)_3]_2Me=CH-C_6H_5$, $Cl_2[P(C_6H_4-H_3)_3]_2Me=CH-C_6H_5$, $Br_2[P(C_5H_4-(CH_3)_2)_3]_2Me=CH-C_6H_5$, $Cl_2[P(C_6H_2-(CH_3)_3)_3]_2Me=CH-C_6H_5$, $Cl_2[P(C_6H_{11})_3-CH_2CH_2-$ $P(C_6H_{11})_3]Me=CH-C_6H_5$, $Cl_2[P(C_5H_9)_3]_2Me=CH-C_6H_{11}$, $Cl_2[P(C_5H_9)_3]_2Me=CH-C_5H_9$, $Cl_2[P(C_5H_9)_3]_2Me=CH-C_6H_{11}$, $Cl_2[P(C_6H_{11})_3]_2Me=CH_2$, $Cl_2[P(C_5H_9)_3]_2Me=CH_2$, $Cl_2[P(C_6H_{11})_3]_2Me=CH-C_6H_4-CH(CH_3)_2$ and $Cl_2[P(C_6H_{11})_3]_2Me=CH-N-C_4H_9$.

The compounds of formula I are known and the preparation thereof is described by Schwab et al. [Schwab, P., France, M. B., Ziller, J. W., Grubbs, R. H., Angew. Chem. 107:2179–2181 (1995)]. The dinuclear compounds of formula Ia can be prepared, for example, by reacting two equivalents of a compound of formula I with one equivalent of a compound known per se of the formula

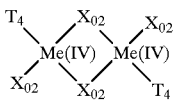

wherein $X_{02}$, Me and $T_4$ are as defined for formula Ia, in the presence of an inert solvent.

The composition according to the invention may additionally contain further open-chain comonomers that form copolymers with the strained cycloolefins. When dienes are additionally used, for example, cross-linked polymerizates may be formed. Some examples of such comonomers are olefinically mono- or di-unsaturated compounds, such as olefins and dienes from the group ethene, propene, butene, pentene, hexene, heptene, octene, decene, dodecylene, cyclohexene (which, as is known, does not form metathesis polymers on its own), acrylic and methacrylic acid and the esters and amides thereof, vinyl ethers, vinyl esters, vinyl chloride, vinylidene chloride, styrene, butadiene, isoprene and chlorobutadiene. When volatile comonomers are additionally used, it is often necessary to carry out the procedures under pressure. The additional use of non-volatile comonomers can therefore be of advantage to the method.

The further open-chain olefins suitable for copolymerization are present in the composition according to the invention for example in an amount of up to 80% by weight, preferably from 0.1 to 80% by weight, especially from 0.5 to 60% by weight and more especially from 5 to 40% by weight, based on the total amount of compounds of formula II and further olefins capable of copolymerization.

Within the scope of this invention, a catalytic amount is preferably an amount of from 0.001 to 20 mol %, especially from 0.01 to 15 mol %, more especially from 0.01 to 10 mol %, and very especially from 0.01 to 5 mol %, based on the amount of monomer. Because ruthenium and osmium catalysts containing phosphine groups have a high catalytic activity, amounts of from 0.001 to 2 mol % are often sufficient, however, and are therefore especially preferred.

The composition according to the invention may contain formulation auxiliaries. Known auxiliaries are antistatics, antioxidants, light stabilisers, plasticisers, dyes, pigments, fillers, reinforcing fillers, lubricants, adhesion promoters, viscosity-increasing agents and demoulding auxiliaries. The fillers may be present in surprisingly high proportions without having an adverse effect on the polymerization, for example in amounts of up to 80% by weight, preferably from 1 to 70% by weight, especially from 5 to 70% by weight, more especially from 5 to 60% by weight and very especially from 10 to 60% by weight, based on the composition. A great variety of fillers and reinforcing fillers for improving the optical, physical, mechanical and electrical properties is known. Some examples are glass and quartz in the form of powders, beads and fibres, metal and semi-metal oxides, carbonates such as $MgCO_3$, $CaCO_3$, dolomite, metal sulfates such as gypsum and barite, natural and synthetic silicates such as talc, zeolites, wollastonite, feldspars, argillaceous earths, such as China clay, crushed stone, whiskers, carbon fibres, plastics fibres or powders, and carbon black. Viscosity-increasing agents are especially metathesis polymerizates that have olefinically unsaturated groups and can be incorporated into the polymer during polymerization. Such metathesis polymerizates are known and are commercially available, for example, under the trade name Vestenamere®. For the same purpose it is also possible to use, for example, poly-1,3-dienes such as polybutadiene, polyisoprene, polychlorobutadiene or copolymers with the basic dienes and one or more olefins. Such polymers are also commercially available, for example Buna® and Kraton®. The amount of viscosity-increasing polymers can be, for example, from 0.1 to 50% by weight, preferably from 1 to 30% by weight and especially from 1 to 20% by weight, based on all the monomers present in the composition. The viscosity-increasing agents serve simultaneously to improve the ductility characteristics of the polymers.

The compositions according to the invention are excellently suitable for the direct production of shaped articles. Despite the high catalyst activity, the individual components can be mixed and brought into the desired form because the catalysts very surprisingly dissolve in non-polar and polar monomers even at room temperature or with slight heating and therefore allow sufficient processing time.

The invention relates also to a method of preparing polymerizates by thermal metathesis polymerization, which method comprises heating a solventless composition comprising (a) at least one strained cycloolefin, and (b) a catalytic amount of at least one compound of formula I or Ia

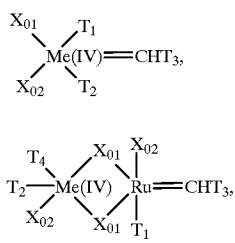

wherein

Me is ruthenium or osmium;

$T_1$ and $T_2$ are each independently of the other a tertiary phosphine or $T_1$ and $T_2$ together form a ditertiary diphosphine;

$T_3$ is hydrogen, $C_1$–$C_{12}$alkyl; $C_3$–$C_8$cycloalkyl, $C_3$–$C_7$heterocycloalkyl having one or two hetero atoms selected from the group —O—, —S— and —N—, $C_6$–$C_{14}$aryl or $C_4$–$C_{15}$heteroaryl having from one to three hetero atoms selected from the group —O—, —S— and —N—, which are unsubstituted or substituted by $C_1$–$C_4$alkyl, $C_1$–$C_4$haloalkyl, $C_1$–$C_4$alkoxy, $C_6$–$C_{10}$aryl, $C_6$–$C_{10}$aryloxy, —NO$_2$ or by halogen;

$T_4$ is $C_6$–$C_{16}$arene or $C_4$–$C_{15}$heteroarene each of which is unsubstituted or substituted by from one to three $C_1$–$C_4$alkyl, $C_1$–$C_4$haloalkyl, $C_1$–$C_4$alkoxy, —OH, F, Cl or Br substituents, and $X_{01}$ and $X_{02}$ are each independently of the other halogen.

The preferences already indicated in respect of the composition apply also to the method according to the invention.

The compositions according to the invention are not stable in storage and monomers and catalyst should be mixed together only just before processing. The method according to the invention is advantageously carried out in such a manner that shaping, for example to give a coating or a moulding, is combined with the mixing and takes place prior to the polymerization. In principle, all known shaping procedures, for example extrusion, injection moulding and compression procedures, can be used. The compositions according to the invention are suitable especially as casting resins where appropriate with the application of pressure, for example as in RIM-processes (Reaction Injection Moulding).

"Heating" may represent a temperature from room temperature up to 300° C., preferably from 30 to 300° C., especially from 40 to 250° C., more especially from 50 to 200° C., and very especially from 60 to 180° C. The polymerization times depend essentially upon the catalyst activity and the times vary from seconds through minutes up to several hours. The polymerization can also be carried out stepwise with increasing temperatures.

Using the method according to the invention it is possible to produce materials (semi-finished articles) for the production of mouldings by means of machining techniques or to produce directly all kinds of mouldings, films, foils and coatings. The invention relates also to the use of the composition according to the invention for the production of semi-finished articles, mouldings and foils. The invention relates also to mouldings made from the compositions according to the invention.

Depending upon the monomer used, the polymers according to the invention may have very different properties. Some are distinguished by a very high degree of oxygen permeability, low dielectric constants, good thermal stability and low water absorption. Others have excellent optical properties, for example high transparency and low refractive indices. Special mention should also be made of the low degree of shrinkage. They can therefore be used in a very wide variety of technical fields. The avoidance of solvents ensures the production of bubble-free mouldings and coatings even at relatively high polymerization temperatures.

When used as coatings on the surfaces of support materials, especially non-polar support materials, the compositions according to the invention are distinguished by high adhesive strength. A physical treatment (for example plasma treatment) or chemical treatment (application of adhesion promoters) can further improve the adhesive strength. The coated materials are also distinguished by a very high degree of surface smoothness and gloss. Among their good mechanical properties, special mention should be made of the low degree of shrinkage and the high impact strength, and also the thermal stability. In addition, they can be readily demoulded when processed in moulds and have a high resistance to solvents. The properties desired in final use can be adjusted selectively by way of the monomers chosen. In addition to rigid and resilient thermoplastic mouldings it is also possible to obtain cross-linked thermosetting or elastomeric polymerizates.

Those polymers are suitable for the production of medical apparatus, implants or contact lenses; for the production of electronic components; as binders for surface-coatings; as photocurable compositions for model-making or as adhesives for bonding substrates having low surface energies (for example Teflon, polyethylene and polypropylene).

The compositions according to the invention are especially suitable for the production of protective coatings on substrates or support materials and relief images. The invention relates also to a variant of the method according to the invention for the preparation of coatings on support materials in which a composition according to the invention is applied as a coating to a support, for example by means of immersion, spreading, pouring, rolling, knife-application or centrifugal casting procedures, and the coating is heated for the purpose of polymerization. This may be followed by heat treatment. Surfaces of substrates can be modified or protected using that method.

The present invention relates also to a coated material comprising (a) a support material and (b) a coating of a composition according to the invention which is applied to at least one surface.

The present invention relates likewise to a coated material comprising (a) a support material and (b) a polymeric coating of a composition according to the invention which is applied to at least one surface.

Suitable substrates (support materials) are, for example, glass, minerals, ceramics, plastics, wood, semi-metals, metals, metal oxides and metal nitrides. The coating thicknesses depend essentially upon the desired use and may be, for example, from 0.1 to 1000 μm, preferably from 0.5 to 500 μm, especially from 1 to 100 μm. The coated materials are distinguished by high adhesive strength and good thermal and mechanical properties.

The production of the coated materials according to the invention can be carried out in accordance with known methods, for example spreading, knife-application or pouring processes, such as curtain coating or centrifugal casting.

The compositions according to the invention are suitable also for the preparation of rubber-like or thermoplastic polymerizates which can be further cross-linked. For that purpose the strained cycloolefins may contain reactive groups, for example (meth)acrylate or epoxy groups, which are covalently bonded to the cycloolefin directly or via a bridge group.

The compositions according to the invention can also be used as thermally curable adhesives for firm bonding to an extremely wide variety of materials, it being possible to achieve excellent peel resistance.

In addition to having high adhesive strengths, excellent processability, good surface properties (smoothness, gloss), high cross-linking density and resistance to solvents and other liquids, the polymerizates according to the invention are also distinguished especially by very good physico-mechanical properties, for example high thermal stability, breaking and flexural strength and impact strength, and excellent electrical properties, for example low conductivities, dielectric constants and ($\epsilon$)- and (tan $\delta$)-loss factors. In addition, mention should be made of the high oxygen permeability and low water absorption. Polymers composed only of carbon and hydrogen are especially valuable from the ecological standpoint because they can, for example, be completely recycled by pyrolysis or harmlessly burned.

The following Examples illustrate the invention in more detail

The following catalysts are used:

$Cl_2[P(C_5H_9)_3]_2Ru(IV)=CH-C_6H_5$ (catalyst A).
$Cl_2[P(C_6H_{11})_3]_2Ru(IV)=CH-C_6H_5$ (catalyst B).
$Cl_2[P(C_6H_{11})_3]_2Ru(IV)=CH-C_6H_4-CH(CH_3)_2$ (catalyst C).

EXAMPLES B1 to B13

The catalyst is dissolved in the monomer, powdered quartz (if used) is added and the mixture is homogenized by stirring. The mixture is then degassed in vacuo. The mixture is poured into moulds and heated. Further data are given in Table 1.

The glass transition temperature is determined by means of differential thermal analysis (heating rate 10° C./min). Swelling is determined by soaking in toluene (the percentage increase in weight after 24 hours storage in toluene is a measure of the cross-linking density). The percentage weight loss is determined by thermogravimetry at a heating rate of 10° C./min up to 300° C.

TABLE 1

| Example No. | Catalyst (% by wt.) | Monomer | Curing cycle (h/° C.) | $T_g$ (° C.) | Weight loss (%) | Swelling (%) | Remarks |
|---|---|---|---|---|---|---|---|
| B1 | B(0.1) | DCPD[1] | 2/120 | 76 | 20.4 | 75 | after about 1 min. rubber-like, then solid |
| B2 | A(0.5) | DCPD[1] | 2/120 | 159 | 1.0 | 83 | after 30 to 45 sec at 35° C. solid |
| B3 | B(0.1) | DCPD[2] | [6] | 10 | 29 | 94 | rubber |
| B4 | A(0.1) | DCPD[2] | [6] | 14 | 31 | 79 | rubber |
| B5 | B(0.3) | DCPD[2] | [6] | 150 | 1.0 | 64 | solid panel |
| B6 | A(0.3) | DCPD[2] | [6] | 108 | 1.1 | 72 | solid panel |
| B7 | A(0.3[3]) | DCPD[2]/60% by weight quartz W12 | [6] | 123 | — | — | solid panel |
| B8 | B(0.3) | norbornene-carboxylic acid methyl | 1/120 | 73 | 0.8 | >400 | solid panel |
| B9 | C(0.2) | DCPD[4] | [7] | 129 | 2.3 | | almost colorless panel |
| B10 | C(0.1) | DCPD[4] | [7] | 115 | 3.0 | | almost colorless panel |
| B11 | C(0.2) | DCPD[5] | [7] | 144 | 2.5 | | almost colorless panel |
| B12 | C(0.1) | DCPD[5] | [7] | 126 | 3.5 | | almost colorless panel |
| B13 | C(0.05) | DCPD[5] | [7] | <R.T | | | rubber |

DCPD: dicyclopentadiene;
[1]distilled and purified;
[2]technical;
[3]based on DCPD;
[4]DCPD Shell degassed (approx. 97% purity);
[5]DCPD BF Goodrich pure (>98.0% purity);
[6] 1/100; 1/120; 4/150;
[7] 1/80; 1/100; 2/120
B9 to B12: Increase in viscosity immediately after the addition of the catalyst.

EXAMPLE B14

DCPD (technical) is homogenized with 0.1% by weight catalyst A and left to stand at room temperature. This mixture is viscous only after 24 hours and after 4 days it is solid and rubber-like.

EXAMPLE B15

DCPD (technical) is homogenized with 0.1% by weight catalyst B and left to stand at room temperature. The mixture is semi-solid only after 24 hours and after 4 days it is solid and rubber-like.

EXAMPLES B14 and B15 show that the technical DCPD is completely polymerized using these catalysts; the polymerization is considerably slower than when purified (freshly distilled) DCPD is used.

What is claimed is:

1. A solventless polymerizable composition comprising
   (a) at least one strained cycloolefin that is liquid or is meltable without decomposition; and
   (b) a catalytic amount of at least one compound of formula Ib

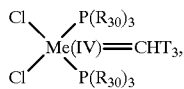

(Ib)

wherein

Me is ruthenium or osmium;

$R_{30}$ is a branched $C_3$–$C_8$alkyl; $C_5$–$C_8$cycloalkyl that is unsubstituted or substituted by $C_1$–$C_4$alkyl, by $C_1$–$C_4$haloalkyl, by $C_1$–$C_4$alkoxy, by halogen or by —$NO_2$; or $C_6$–$C_{10}$aryl that is unsubstituted or substituted by $C_1$–$C_4$alkyl, by $C_1$–$C_4$haloalkyl, by $C_1$–$C_4$alkoxy, by halogen or by —$NO_2$; and $T_3$ is $C_6$–$C_{10}$aryl.

2. A composition according to claim 1 wherein component (a) is dicyclopentadiene.

3. A composition according to claim 1 where in the compound of formula Ib, Me is ruthenium.

4. A composition according to claim 1 where in the compound of formula Ib, $R_{30}$ is cyclohexyl.

5. A composition according to claim 1 wherein the compound of formula Ib is present in an amount from 0.001 to 20 mol %, based on the amount of component (a).

6. A composition according to claim 5 wherein the amount is from 0.001 to 2 mol %.

7. A method of preparing polymerizates by metathesis polymerization which method comprises heating a solventless composition according to claim 1.

* * * * *